(12) United States Patent
Ohira et al.

(10) Patent No.: US 10,439,209 B2
(45) Date of Patent: Oct. 8, 2019

(54) ELECTRODE AND NON-AQUEOUS ELECTROLYTE SECONDARY BATTERY

(71) Applicant: DENSO CORPORATION, Kariya, Aichi-pref. (JP)

(72) Inventors: Koji Ohira, Kariya (JP); Daisuke Shibata, Kariya (JP); Shuhei Yoshida, Kariya (JP); Keita Takahashi, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 153 days.

(21) Appl. No.: 14/994,247

(22) Filed: Jan. 13, 2016

(65) Prior Publication Data

US 2016/0211515 A1 Jul. 21, 2016

(30) Foreign Application Priority Data

Jan. 15, 2015 (JP) .................................. 2015-5996

(51) Int. Cl.
| | |
|---|---|
| *H01M 4/58* | (2010.01) |
| *H01M 4/525* | (2010.01) |
| *H01M 4/62* | (2006.01) |
| *H01M 4/36* | (2006.01) |
| *H01M 4/136* | (2010.01) |
| *H01M 10/0525* | (2010.01) |

(52) U.S. Cl.
CPC ........... *H01M 4/366* (2013.01); *H01M 4/136* (2013.01); *H01M 4/525* (2013.01); *H01M 4/5825* (2013.01); *H01M 4/625* (2013.01); *H01M 10/0525* (2013.01)

(58) Field of Classification Search
CPC ............................ H01M 4/5825; H01M 4/525
See application file for complete search history.

(56) References Cited

U.S. PATENT DOCUMENTS

| | | | |
|---|---|---|---|
| 2001/0016291 A1 | 8/2001 | Yang et al. | |
| 2011/0223482 A1 | 9/2011 | Fujii et al. | |
| 2014/0065480 A1* | 3/2014 | Yoshida | H01M 4/133 429/220 |
| 2014/0315089 A1* | 10/2014 | Yu | H01M 4/366 429/223 |
| 2015/0333323 A1* | 11/2015 | Umeyama | H01M 10/4235 429/61 |

FOREIGN PATENT DOCUMENTS

| | | |
|---|---|---|
| JP | 2001223030 A | 8/2001 |
| JP | 2003292307 A | 10/2003 |
| JP | 2011159388 A | 8/2011 |
| JP | 2012033438 A | 2/2012 |
| JP | 2014-002857 A | 1/2014 |
| JP | 2014-010981 A | 1/2014 |
| JP | 2014194868 A | 10/2014 |
| WO | WO-2012049723 A1 | 4/2012 |

\* cited by examiner

*Primary Examiner* — Jonathan Crepeau
(74) *Attorney, Agent, or Firm* — Harness, Dickey & Pierce, P.L.C.

(57) ABSTRACT

An electrode includes an electrode material, which includes: a core part made of an active substance having a polyanion structure having Mn; and a shell part obtained by covering a surface of the core part with carbon. In addition, an amount of water, as measured by Karl Fischer's method when the electrode is held at 250° C. for 40 minutes after adsorbed water is volatilized by heating, is 1500 ppm or less.

7 Claims, 2 Drawing Sheets

ELECTRODE AND NON-AQUEOUS ELECTROLYTE SECONDARY BATTERY

CROSS REFERENCE TO RELATED APPLICATIONS

This application is based on Japanese Patent Application No. 2015-5996 filed on Jan. 15, 2015, the disclosure of which is incorporated herein by reference.

TECHNICAL FIELD

The present disclosure relates to an electrode and a non-aqueous electrolyte secondary battery.

BACKGROUND

In accordance with the prevalence of notebook-type personal computers, portable phones, digital cameras, and the like, demand for secondary batteries is increasing for driving these small-scale electronic apparatuses. Further, in these electronic apparatuses, use of non-aqueous electrolyte secondary batteries (in particular, lithium ion secondary batteries) is being developed because such non-aqueous electrolyte secondary batteries can be made to have a high capacity.

In addition to use of such non-aqueous electrolyte secondary batteries in small-scale electronic apparatuses, studies are made on application of the non-aqueous electrolyte secondary batteries to use in which a large electric power is demanded such as in vehicles (e.g., electric vehicles (EVs), hybrid vehicles (HVs), plug-in hybrid vehicles (PHVs)), power sources for use at home (e.g., a home energy management system (HEMS)), and the like. In this case, a large electric power is obtained by means such as increase in scale of electrode plates in the non-aqueous electrolyte secondary batteries, lamination of numerous electrode plates to form an electrode body, and assemblage of numerous battery cells to make an assembled battery.

Typically, in the non-aqueous electrolyte secondary batteries, an electrode body is formed by lamination in a state in which a separator is interposed between a positive electrode plate and a negative electrode plate, and the electrode body is housed in a case together with a non-aqueous electrolyte. The electrode plates are produced by applying a paste containing an electrode active substance on a surface of a current collector made of a metal plate (metal foil), drying, and molding into a predetermined shape.

A non-aqueous electrolyte secondary battery is disclosed in, for example, Patent Literature 1. Patent Literature 1 discloses a non-aqueous electrolyte secondary battery including an electrode body including a positive electrode and a negative electrode, and a non-aqueous electrolyte. In the non-aqueous electrolyte secondary battery, the positive electrode includes a positive electrode mixture layer (positive electrode active substance layer) containing a positive electrode active substance made of lithium transition metal oxide. An amount of water in the positive electrode mixture layer, as detected by Karl Fischer's method after the electrode is held at 120° C. for 30 minutes, is 300 ppm or less. An amount of water in the positive electrode mixture layer, as detected by Karl Fischer's method after the electrode is held at 300° C. for 30 minutes, is 3000 ppm or more and 10000 ppm or less. According to this non-aqueous electrolyte secondary battery, excellent battery characteristics and high reliability (endurance at the time of internal short-circuiting) are made compatible with each other by adjusting the amount of water contained in the electrode mixture layer to be within a suitable range.

However, in a conventional non-aqueous electrolyte secondary battery, the positive electrode contains water (the amount of water is within a range from 3000 ppm to 10000 ppm), and this water raises a problem of decrease in reliability of the non-aqueous electrolyte secondary battery. More specifically, there is a problem in that, during the use of the non-aqueous electrolyte secondary battery, water is released into the secondary battery for a long period of time, which causes generation of a gas for a long period of time or deterioration of battery performance.

[Patent Literature 1] JP 2014-10981-A

SUMMARY

It is an object of the present disclosure to provide an electrode and a non-aqueous electrolyte secondary battery being excellent in safety.

As a result of repeated studies made by the present inventors on electrodes of non-aqueous electrolyte secondary batteries in order to solve the aforementioned problem, the present inventors have found that the water contained in an electrode can be classified into adsorbed water and bonded water and, by making an electrode that does not contain these two kinds of water, have completed the invention of the present disclosure.

In other words, the present disclosure provides an electrode including an electrode material that includes: a core part made of an active substance having a polyanion structure having Mn and a shell part obtained by covering a surface of the core part with carbon, wherein an amount of water, as measured by Karl Fischer's method when the electrode is held at 250° C. for 40 minutes after adsorbed water is volatilized by heating, is 1500 ppm or less.

With this configuration, the electrode of the present disclosure has a smaller amount of water contained in the electrode. This restrains decrease in the safety of the electrode caused by reaction of the water contained in the electrode with the active substance or the electrolyte within the electrode, whereby an electrode excellent in safety is produced.

The present disclosure also provides a non-aqueous electrolyte secondary battery including the above-mentioned electrode as a positive electrode.

The non-aqueous electrolyte secondary battery of the present disclosure is made by using the above-described electrode as a positive electrode, thereby producing the above-mentioned effects.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Hereinafter, an electrode and a non-aqueous electrolyte secondary battery of the present disclosure will be specifically described with reference to the attached drawings as modes that are carried out in a positive electrode for a lithium ion secondary battery and a lithium ion secondary battery including the same.

First Embodiment

Figure 1:
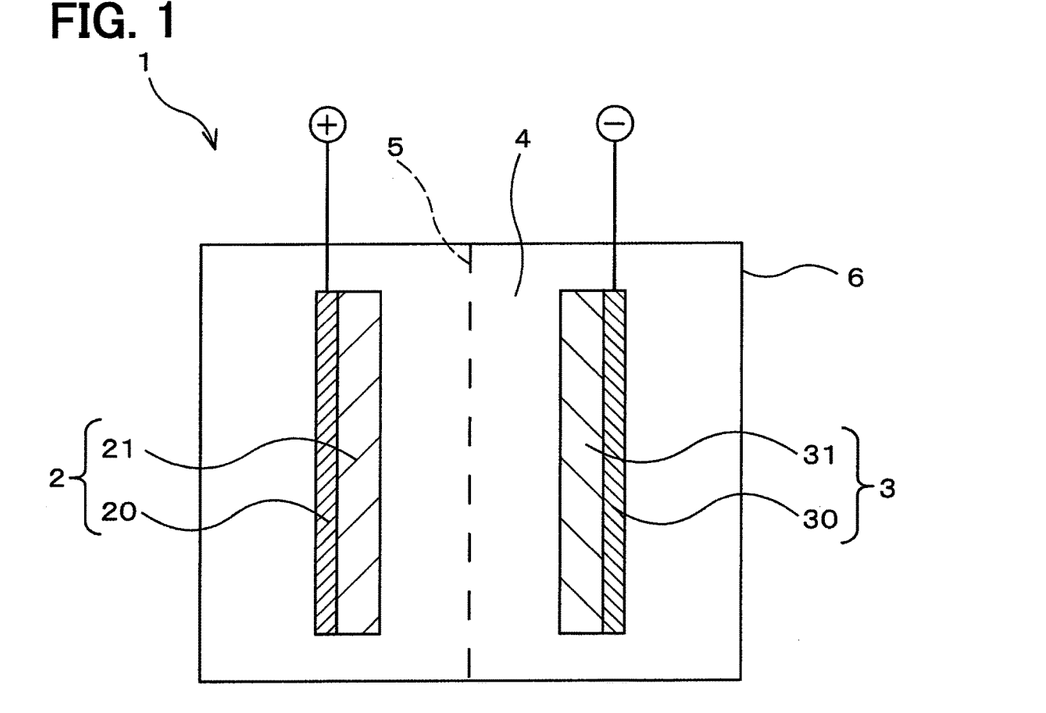
FIG. 1 is a schematic view illustrating a configuration of a lithium ion secondary battery according to a first embodiment.

A secondary battery of the present embodiment is a lithium ion secondary battery 1 whose configuration is illustrated in the schematic view of FIG. 1. The lithium ion secondary battery 1 includes a positive electrode 2, a negative electrode 3, and a non-aqueous electrolyte 4.

[Positive Electrode]

The positive electrode 2 contains a positive electrode material (electrode material, positive electrode active substance). The positive electrode 2 has a positive electrode active substance layer 21 containing the positive electrode material on a surface of a positive electrode current collector 20. The positive electrode active substance layer 21 is formed by applying a positive electrode mixture, which is obtained by mixing the positive electrode material (positive electrode active substance) with an electroconductive material and a binding material, on a surface of the positive electrode current collector 20, followed by drying. The positive electrode mixture is in a paste form (slurry form) by means of a suitable solvent.

The positive electrode material has a core part made of an active substance having a polyanion structure containing Mn and a shell part obtained by covering a surface of the core part with carbon. This positive electrode material has an improved electric conductivity (electron conductivity) by covering the core part having a low electric conductivity with the shell part made of carbon having a high electric conductivity.

The active substance having a polyanion structure containing Mn (the active substance that forms the core part of the positive electrode material) contains Mn in a composition thereof. This active substance that forms the core part has a higher safety (endurance against short-circuiting) as compared with a positive electrode active substance that does not contain Mn. Moreover, this active substance that forms the core part can realize a higher electric potential of a battery as compared with an active substance that does not contain Mn.

An average electric potential of the battery is preferably 3.6 V or higher, more preferably 3.7 V or higher. The active substance having a polyanion structure containing Mn is preferable because an electric potential of a battery of 3.6 V or higher can be realized. By improving the average electric potential, the energy density of the battery can be increased.

The active substance having a polyanion structure containing Mn that forms the core part is not particularly limited; however, the active substance can be set to be $Li_\alpha Mn_{1-\beta} M_\beta X_\eta O_{4-\gamma} Z_\gamma$ (M: one or more kinds selected from Co, Ni, Fe, Cu, Cr, Mg, Ca, Zn, and Ti, X: one or more kinds selected from P, As, Si, Mo, and Ge, Z: can arbitrarily contain one or more kinds selected from Al, Mg, Ca, Zn, and Ti, $0<\alpha \leq 2.0$, $0 \leq \beta <1.5$, $1 \leq \eta \leq 1.5$, $0 \leq \gamma \leq 1.5$). Among these, the active substance is more preferably $LiMn_{1-x}Fe_xPO_4$ ($0 \leq x < 0.5$, Mn>Fe).

The positive electrode material may be formed of two or more kinds of substances having different compositions within a range shown in the above compositional formula.

The positive electrode 2 may either contain the above positive electrode material alone as a positive electrode active substance or may be mixed with other positive electrode active substances. The other positive electrode active substances are substances that are used as positive electrode active substances in a conventional lithium ion secondary battery. The positive electrode active substances in a conventional lithium ion secondary battery may be, for example, various oxides, sulfides, lithium-containing oxides, and electroconductive polymers. The positive electrode active substance is preferably a lithium-transition metal composite oxide.

The lithium-transition metal composite oxide may be, for example, a composite oxide satisfying ($0 \leq \alpha \leq 2.0$, $0 \leq \beta \leq 1.5$, $1 \leq \eta \leq 1.5$, $0 \leq \gamma \leq 1.5$) in the above compositional formula.

Here, the other positive electrode active substances may have either a polyanion structure or a structure other than the polyanion structure. For example, an oxide having a layer structure represented by $LiNi_{1/3}Co_{1/3}Mn_{1/3}O_2$ may be raised as an example. Because this oxide has a meager reactivity with water (absorbs little water), the other positive electrode active substances preferably have a meager water absorption and more preferably does not react with water. In the same manner as in the above positive electrode material, the surface of the other positive electrode active substances may be covered with carbon.

In the case in which the positive electrode 2 contains a mixture of the above positive electrode material and other positive electrode active substances, the mixing ratio thereof is not limited as long as the amount of water described later is satisfied. A state of being rich in the above positive electrode material is preferable. In other words, it is preferable that the number of Li atoms in the above positive electrode material be 50% or more assuming that the sum amount of Li atoms in the positive electrode active substances is 100%. It is also preferable that the mass of the above positive electrode material be 50 mass % or more assuming that the sum mass of the positive electrode active substances is 100 mass %.

In the positive electrode material (electrode material) that forms a core-shell structure in the positive electrode 2, it is preferable that, when 0.07 times the specific surface area (A ($m^2/g$)) of the core part (active substance) and the ratio (B (mass %)) of the carbon coat of the shell part are compared, the ratio of the carbon coat be larger (a relationship of (0.07×A)<B is satisfied). Here, the ratio of the carbon coat as represented by B (mass %) represents the mass ratio of the carbon that forms the shell part assuming that the mass of the positive electrode material that forms the core-shell structure is 100 mass %.

In other words, it is preferable that the positive electrode material (electrode material) satisfy a relationship of (0.07×A)<B where A represents a specific surface area ($m^2/g$) of the core part (active substance), and B represents a mass ratio (mass %) of the carbon that forms the shell part relative to the positive electrode material (electrode material) having the core-shell structure.

By satisfying the relationship of (0.07×A)<B, the water content in the positive electrode material having the core-shell structure can be reduced. This relationship shows that, in the positive electrode material having the core-shell structure, the ratio of the carbon coat in the shell part is large. The carbon that forms the shell part prevents the core part from absorbing water. For this reason, the water content of the positive electrode material can be further reduced as the ratio of the carbon coat in the shell part is larger.

The electroconductive material ensures the electric conductivity of the positive electrode 2. Examples of the electroconductive material may include, but not limited thereto, fine particles of graphite, fine particles of amorphous carbon such as carbon black such as acetylene black, Ketjen black, and carbon nanofiber, needle cokes, and the like.

The binding material of the positive electrode mixture binds positive electrode active substance particles and electroconductive materials. Examples of the binding material may include, but not limited thereto, PVDF, EPDM, SBR, NBR, fluororubber, and the like.

As the solvent of the positive electrode mixture, an organic solvent that dissolves the binding material is typically used. Examples of the organic solvent may include, but not limited thereto, NMP, dimethylformamide, dimethylacetamide, methyl ethyl ketone, cyclohexanone, methyl acetate, methyl acrylate, diethyltriamine, N—N-dimethylaminopropylamine, ethylene oxide, tetrahydrofuran, and the like. Also, there are cases in which a dispersing agent, a thickening agent, and the like are added to water, and the positive electrode active substance is made into a slurry with use of PTFE or the like.

The positive electrode current collector 20 may be made of, but not limited thereto, for example, a material obtained by processing a metal such as aluminum or stainless steel, for example, a foil processed in a plate form, a net, a punched metal, a form metal, or the like.

The positive electrode active substance layer 21 of the positive electrode 2 in the present embodiment preferably has a specific surface area within a range from 5 to 20 ($m^2$/g). Here, the specific surface area is a BET specific surface area.

The specific surface area of the positive electrode active substance layer 21 gives an influence on the contact with the non-aqueous electrolyte 4. In other words, when the specific surface area is less than 5 ($m^2$/g), the area of contact between the non-aqueous electrolyte 4 and the positive electrode active substance contained in the positive electrode active substance layer 21 becomes too small (amount of reaction with Li ions decreases), leading to decrease in the battery performance. On the other hand, when the specific surface area becomes large to exceed 20 ($m^2$/g), the water adsorption area corresponding to the specific surface area becomes large. As a result, the amount of water contained in the positive electrode active substance layer 21 increases, thereby failing to ensure the long-term reliability.

The total mass of the carbonaceous material contained in the positive electrode active substance layer 21 of the positive electrode 2 according to the present embodiment is preferably within a range from 4 to 8 mass % assuming that the mass of the whole positive electrode active substance layer 21 (whole electrode active substance layer) is 100 mass %. When the total mass of the carbonaceous material contained in the positive electrode active substance layer 21 is within this range, the electron conductivity that can maintain the battery performance of the lithium ion secondary battery 1 can be imparted, and the amount of water can be restrained to be within a prescribed range, whereby the long-term reliability can be maintained. Further, when the total mass is less than 4 (mass %), the electron conductivity becomes insufficient, thereby leading to decrease in the battery performance. When the total mass exceeds 8 (mass %), the amount of water increases, so that the long-term reliability cannot be maintained.

In the positive electrode active substance layer 21 of the positive electrode 2 according to the present embodiment, it is preferable that the density of the active substance layer 21 be within a range from 1.8 to 2.3 (g/$cm^3$). When the density of the positive electrode active substance layer 21 is within this range, the battery performance of the lithium ion secondary battery 1 can be maintained. Further, when the density is less than 1.8 (g/$cm^3$), the electron conductivity decreases, though the water contained in the positive electrode 2 in a dry state can be restrained. On the other hand, when the density exceeds 2.3 (g/$cm^3$), the amount of water contained in the positive electrode 2 in a dry state increases, and the amount of electrolytic solution in the electrode decreases, whereby the ion conductivity becomes insufficient.

The amount of water in the positive electrode 2 according to the present embodiment, as measured by Karl Fischer's method (hereinafter referred to as the KF method) when the electrode is held at 250° C. for 40 minutes after adsorbed water is volatilized by heating, is 1500 ppm or less. When the amount of water measured by the KF method is 1500 ppm or less, generation of gas caused by water or decrease in the battery performance can be restrained in the positive electrode 2 according to the present embodiment.

Specifically, the water contained in the positive electrode active substance layer 21 can be classified into two kinds. One is an adsorbed water that is physically adsorbed onto the surface of the substance (positive electrode active substance and electroconductive material) constituting the positive electrode active substance layer 21. The other one is a bonded water that is chemically bonded by reaction with a substance (for example, positive electrode material (positive electrode active substance)) having a reactivity with water among the substances constituting the positive electrode active substance layer 21.

Among these two kinds of water, the adsorbed water can be volatilized (evaporated) by heating.

The chemically bonded water is less liable to be volatilized (evaporated) than the adsorbed water due to the kind of bonding thereof. By providing conditions that are harder than for volatilization of adsorbed water, the chemically bonded water can be volatilized (evaporated) (chemical bond can be cut). Further, the chemically bonded water is measured by the KF method when the electrode is held at 250° C. for 40 minutes. When the amount of water measured by the KF method is 1500 ppm or less, the positive electrode 2 of the present embodiment has a smaller ratio of containing chemically bonded water, whereby generation of gas caused by water or decrease in the battery performance can be restrained.

Here, the chemically bonded water is gradually volatilized (evaporated) from the positive electrode material when charging/discharging is repeated in the lithium ion secondary battery 1 of the present embodiment. In other words, when the amount of water measured by the KF method is large to exceed 1500 ppm, generation of gas caused by water or decrease in the battery performance are liable to occur when charging/discharging is repeated in the lithium ion secondary battery 1 of the present embodiment.

The measurement by Karl Fischer's method (KF method) can be carried out using a commercially available Karl Fischer testing apparatus.

The conditions (heating temperature and the like) for heating to volatilize (evaporate) the adsorbed water, which is carried out before the measurement by the KF method, are not particularly limited as long as the adsorbed water can be volatilized (evaporated). It is preferable to volatilize the adsorbed water by heating to a temperature above or equal to the boiling point of water. Heating to 120° C. is more preferable.

The heating to volatilize (evaporate) the adsorbed water is preferably kept at a predetermined temperature for a predetermined period of time. The predetermined temperature is preferably 120° C. as described above. The predetermined period of time is not particularly limited, but can be arbitrarily set as a period of time for volatilizing (evaporating) the adsorbed water.

The heating to volatilize (evaporate) the adsorbed water is preferably carried out under an ordinary pressure, but can be carried out under reduced pressure. When the heating is carried out under reduced pressure, the heating temperature can be lowered.

In the positive electrode 2 of the present embodiment, it is preferable that the adsorbed water also be little in amount.

The amount of water in the positive electrode 2 according to the present embodiment, as measured by the KF method when the electrode is held at 120° C. for 5 minutes, is preferably 800 ppm or more. When the amount of water measured by the KF method is 800 ppm or more, the active substance surface after drying will have voids containing the electrolytic solution, whereby battery characteristics can be obtained. When the amount of water is less than 800 ppm, reaction points will be insufficient in amount on the active substance surface after drying, thereby lowering the battery performance.

The amount of water in the positive electrode 2 according to the present embodiment, as measured by Karl Fischer's method when the electrode is held at 120° C. for 30 minutes, is preferably 2000 ppm or less. When the amount of water measured by the KF method is 2000 ppm or less, the positive electrode 2 will have little amount of adsorbed water as well. When the amount of water is large to exceed 2000 ppm, it will be difficult to remove the adsorbed water completely, thereby deteriorating the long-term reliability of the battery.

[Negative Electrode]

The negative electrode 3 contains a negative electrode active substance. The negative electrode 3 has a negative electrode active substance layer 31 on a surface of a negative electrode current collector 30. The negative electrode active substance layer 31 is formed by applying a negative electrode mixture, which is obtained by mixing the negative electrode active substance with a binding material, on the surface of the negative electrode current collector 30, followed by drying. The negative electrode mixture is in a paste form (slurry form) by means of a suitable solvent.

A conventional negative electrode active substance can be used as the negative electrode active substance of the negative electrode 3. Examples of the negative electrode active substance may include a negative electrode active substance containing at least one element among Sn, Si, Sb, Ge, and C. Among these negative electrode active substances, C is preferably a carbon material capable of intercalating and deintercalating the electrolyte ions (that is, having a Li-intercalating capability) of the lithium ion secondary battery, and is more preferably an amorphous coat natural graphite.

Also, among these negative electrode active substances, Sn, Sb, and Ge are alloy materials showing much volume change. These negative electrode active substances may be an alloy with other metals, such as Ti—Si, Ag—Sn, Sn—Sb, Ag—Ge, Cu—Sn, and Ni—Sn.

Examples of the electroconductive material of the negative electrode 3 may include a carbon material, a metal powder, an electroconductive polymer, and the like. From the viewpoint of electric conductivity and safety, it is preferable to use a carbon material such as acetylene black, Ketjen black, or carbon black.

Examples of the binding material of the negative electrode 3 may include polytetrafluoroethylene (PTFE), polyvinylidene fluoride (PVDF), fluororesin copolymer (tetrafluoroethylene-hexafluoropropylene copolymer), SBR, acrylic rubber, fluororubber, polyvinyl alcohol (PVA), styrene-maleic acid resin, polyacrylate, carboxymethyl cellulose (CMC), and the like.

The solvent of the mixture of the negative electrode 3 may be, for example, an organic solvent such as N-methyl-2-pyrrolidone (NMP), water, or the like.

A conventional current collector can be used as the negative electrode current collector 30. The negative electrode current collector 30 may be made of, but not limited thereto, for example, a material obtained by processing a metal such as copper, stainless steel, titanium, or nickel, for example, a foil processed in a plate form, a net, a punched metal, a form metal, or the like.

[Non-Aqueous Electrolyte]

The material configuration of the non-aqueous electrolyte 4 is not particularly limited, but a non-aqueous electrolyte having a conventional material configuration can be used. The non-aqueous electrolyte 4 (which is also referred to as non-aqueous electrolytic solution) of the present embodiment is preferably made by dissolving a supporting salt into an organic solvent, in the same manner as a conventionally known non-aqueous electrolyte.

The kind of the supporting salt of the non-aqueous electrolyte is not particularly limited. For example, the supporting salt is preferably at least one kind of an inorganic salt selected from $LiPF_6$, $LiBF_4$, $LiCl_4$, and $LiAsF_6$, a derivative of these inorganic salts, an organic salt selected from $LiSO_3CF_3$, $LiC(SO_3CF_3)_3$, and $LiN(SO_2CF_3)_2$, $LiN(SO_2C_2F_5)_2$, and $LiN(SO_2CF_3)(SO_2C_4F_9)$, and a derivative of these organic salts. These supporting salts can make the battery performance be further more excellent and can maintain the battery performance to be further high in a temperature range other than room temperature. The concentration of the supporting salt also is not particularly limited, so that the concentration is preferably selected suitably by considering the kind of the supporting salt and the organic solvent.

The organic solvent (non-aqueous solvent) into which the supporting salt is dissolved is not particularly limited as long as the solvent is an organic solvent used in an ordinary non-aqueous electrolyte. Examples of the organic solvent that can be used may include carbonates, halogenated hydrocarbons, ethers, ketones, nitriles, lactones, oxolane compounds, and the like. In particular, propylene carbonate, ethylene carbonate, 1,2-dimethoxyethane, dimethyl carbonate, diethyl carbonate, ethyl methyl carbonate, vinylene carbonate, and the like and mixed solvents of these are preferable. Particularly, among these organic solvents, it is preferable to use one or more kinds of non-aqueous solvents selected from the group consisting of carbonates and ethers, because these non-aqueous solvents are excellent in the solubility of supporting salts, dielectric constant, and viscosity, and the charging and discharging efficiency of the lithium ion secondary battery 1 is thereby enhanced.

In the lithium ion secondary battery 1 according to the present embodiment, the most preferable non-aqueous electrolyte is one in which the supporting salt is dissolved in an organic solvent.

[Other Configurations]

In the non-aqueous electrolyte secondary battery 1 according to the present embodiment, the positive electrode 2 and the negative electrode 3 are housed in a battery case 6 together with the non-aqueous electrolyte 4 in a state in which the positive electrode active substance layer 21 and the negative electrode active substance layer 31 face each other via a separator 5.

(Separator)

The separator 5 plays a role of electrically insulating the positive electrode 2 and the negative electrode 3 from each other and holding the non-aqueous electrolyte 4. As the separator 5, it is preferable to use, for example, a porous synthesized resin membrane, particularly a porous membrane made of a polyolefin-based polymer (polyethylene, polypropylene).

(Battery Case)

The positive electrode 2 and the negative electrode 3 are housed (enclosed) in the inside of the battery case 6 together with the non-aqueous electrolyte 4 in a state in which the separator 5 is interposed therebetween.

The battery case 6 is made of a material that inhibits permeation of water between the inside and the outside. Such a material may be, for example, a material having a metal layer.

Effects of First Embodiment

As described above, in the lithium ion secondary battery 1 according to the present embodiment, the positive electrode 2 has a smaller content of water. For this reason, elution of water into the lithium ion secondary battery 1 is restrained when charging and discharging is repeated. As a result, generation of gas caused by water and decrease in the battery performance are advantageously restrained.

Second Embodiment

Figure 2:
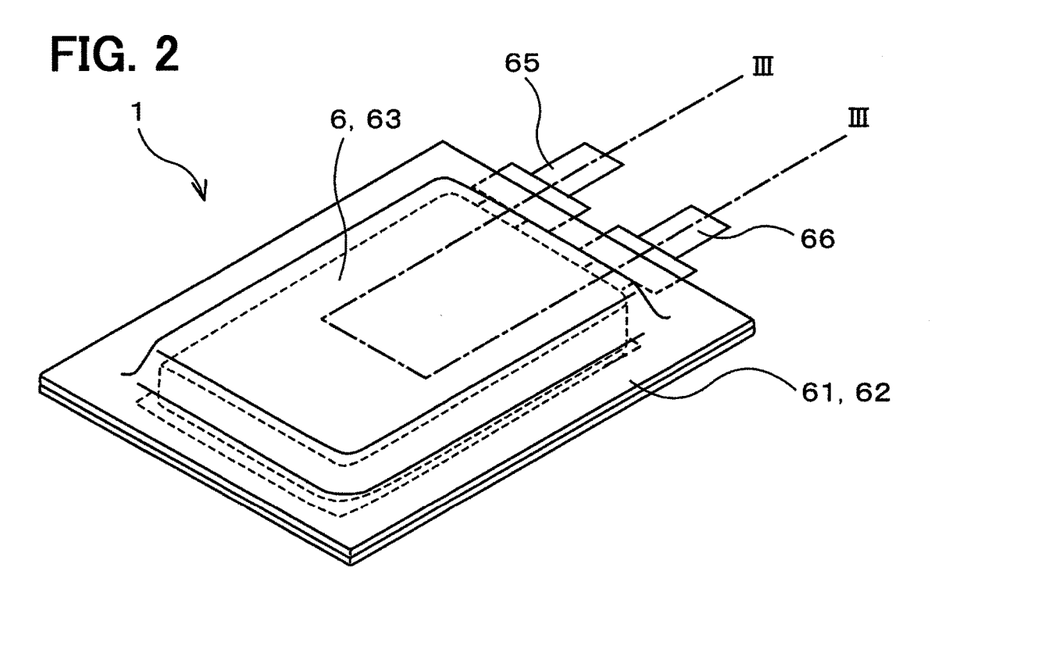
FIG. 2 is a perspective view illustrating a configuration of a lithium ion secondary battery according to a second embodiment.
Figure 3:
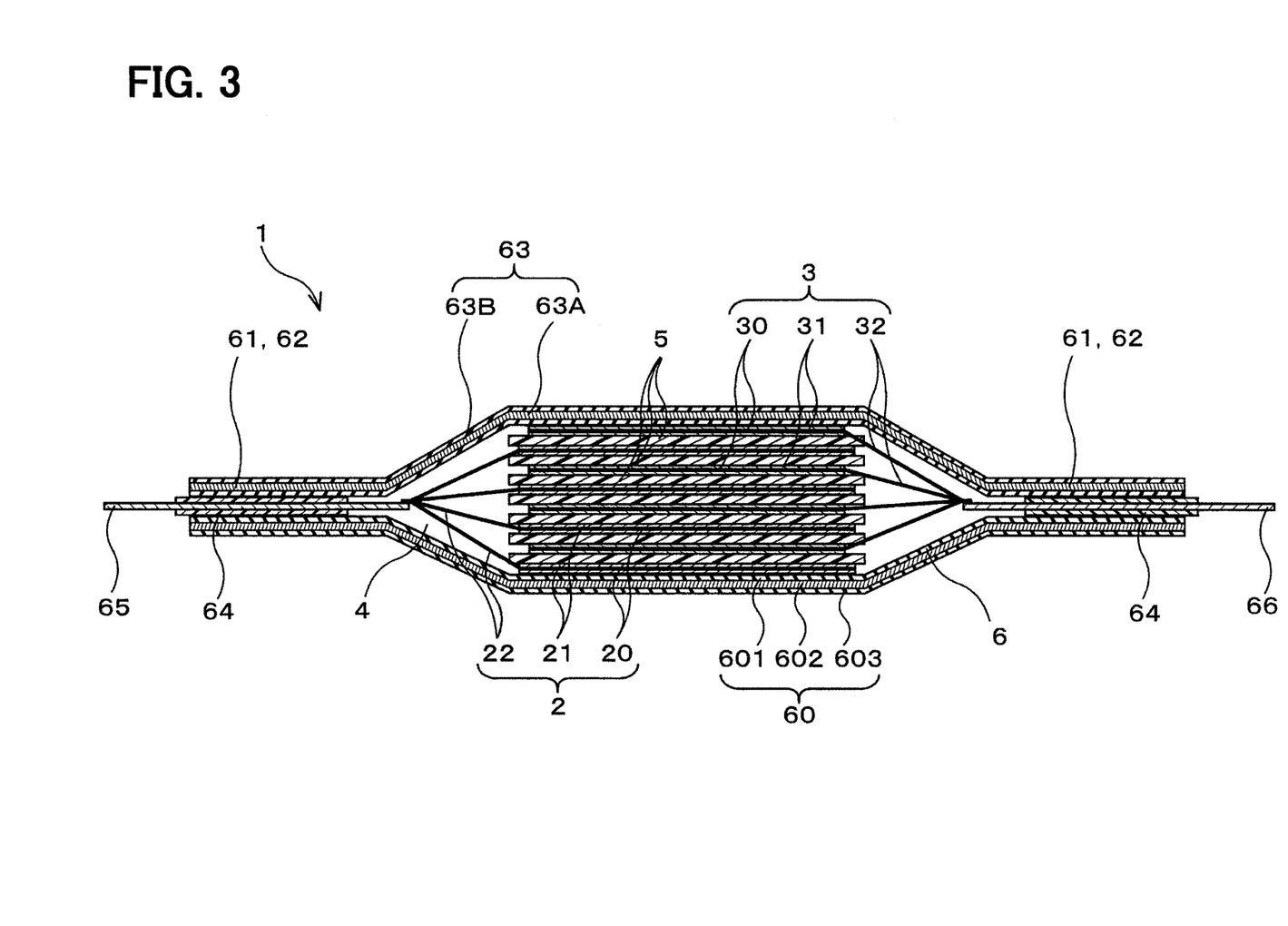
FIG. 3 is a sectional view illustrating the configuration of the lithium ion secondary battery according to the second embodiment.

This embodiment shows a mode in which the lithium ion secondary battery 1 of the first embodiment is applied to a battery of lamination type, where the configuration features such as the positive electrode 2, the negative electrode 3, and the non-aqueous electrolyte 4 are the same as in the first embodiment. The configuration of the secondary battery 1 according to the present embodiment is shown in FIGS. 2 and 3. FIG. 2 is a perspective view illustrating a configuration of the secondary battery 1, and FIG. 3 is a sectional view taken along line in FIG. 2.

The lithium ion secondary battery 1 of the present embodiment is formed by housing (enclosing) the positive electrode 2 and the negative electrode 3 in a battery case 6 formed of a laminate case. The configuration features not specified in the present embodiment are the same as in the first embodiment.

The positive electrode 2 is made by forming a positive electrode active substance layer 21 on a surface (both surfaces) of a positive electrode current collector 20 having a generally rectangular shape. The positive electrode 2 has a non-applied part 22 in which the positive electrode current collector 20 is exposed (the positive electrode active substance layer 21 is not formed) on one side of the rectangular shape.

The negative electrode 3 is made by forming a negative electrode active substance layer 31 on a surface (both surfaces) of a negative electrode current collector 30 having a generally rectangular shape. The negative electrode 3 has a non-applied part 32 in which the negative electrode current collector 30 is exposed (the negative electrode active substance layer 31 is not formed) on one side of the rectangular shape.

The negative electrode active substance layer 31 of the negative electrode 3 is formed to be wider than the positive electrode active substance layer 21 of the positive electrode 2. The negative electrode active substance layer 31 is formed to have a size such that the positive electrode active substance layer 21 can be completely covered without being exposed when the negative electrode active substance layer 31 of the negative electrode 3 is superposed on the positive electrode active substance layer 21.

The positive electrode 2 and the negative electrode 3 are housed (enclosed) in the battery case 6 formed of a laminate film together with the non-aqueous electrolyte 4 in a state in which the positive electrode 2 and the negative electrode 3 are stacked via a separator 5.

The separator 5 is formed to have a wider area than the negative electrode active substance layer 31.

The positive electrode 2 and the negative electrode 3 are stacked in a state in which the centers of the positive electrode active substance layer 21 and the negative electrode active substance layer 31 are superposed with the separator 5 interposed therebetween. At this time, the non-applied part 22 of the positive electrode 2 and the non-applied part 32 of the negative electrode 3 are disposed in opposite directions (in directions that are opposite to each other).

(Battery Case)

The battery case 6 is formed of a laminate film 60. The laminate film includes a plastic resin layer 601, a metal foil 602, and a plastic resin layer 603 laminated in this order. The battery case 6 is bonded by pressing the laminate film 60, which is bent in a predetermined shape in advance, onto another laminate film or the like in a state in which the plastic resin layers 601, 603 are softened by heat or a solvent of some sort.

The battery case 6 is formed by superposing laminate films 60, which are molded (embossed) in advance into a shape capable of housing the positive electrode 2 and the negative electrode 3, onto each other, bonding the peripheries of the outer circumference over the whole circumference, and enclosing the positive electrode 2 and the negative electrode 3 in the inside thereof. By bonding of the outer circumference, a sealing part is formed. The bonding of the outer circumference in the present embodiment is made by fusion-bonding.

The battery case 6 is formed by superposing a laminate film 60 onto another laminate film 60. Here, the other laminate film 60 refers to a laminate film that is bonded (fusion-bonded). In other words, the modes of the battery case 6 include not only a mode in which the battery case 6 is formed of two or more sheets of laminate films 60 but also a mode in which the battery case 6 is formed by folding one sheet of laminate film.

The bonding (assembling) of the outer circumference of the battery case 6 is carried out in a reduced-pressure atmosphere (preferably in vacuum). This allows that the battery case 6 to have only the electrode body enclosed therein without containing the ambient air (water contained therein).

Referring to FIGS. 2 and 3, the laminate film 60 molded in advance has a flat plate part 61 that forms a sealing part 62 when superposed onto another laminate film 60, and a tank-shaped part 63 formed at the central part of the flat plate part 61 to be capable of housing the positive electrode 2 and the negative electrode 3.

Referring to FIGS. 2 and 3, the laminate films 60, 60 are bent (molded) to have a concave shape capable of housing the positive electrode 2 and the negative electrode 3. The laminate films 60, 60 have the same shape, so that the flat plate parts 61, 61 overlap completely with each other when superposed in a direction such that the laminate films 60, 60 face each other.

In the laminate film 60, the flat plate part 61 and a bottom part 63A of the tank-shaped part 63 (a part that forms an end in a stacking direction of the lithium ion secondary battery 1) are formed in parallel. The flat plate part 61 and the bottom part 63A of the tank-shaped part 63 are connected by an standing part 63B. The standing part 63B extends in a crossing direction (oblique direction) relative to the parallel direction of the flat plate part 61 and the bottom part 63A. The bottom part 63A is formed to be smaller than an opening of the tank-shaped part 63 (inner end of the flat plate part 61).

In the battery case 6, the sealing part 62 is formed in the peripheries of the flat plate parts 61, 61, and a non-bonded part in which the flat plate parts 61, 61 overlap with each other is formed in the inner side of the sealing part 62 (in the direction coming close to the electrode body). The non-bonded parts in which the flat plate parts 61, 61 overlap with each other may be either in a state of abutting against each other or in a state in which a gap is formed therebetween. Further, the non-applied parts 22, 32 of the electrode plates 2, 3 or the separator 5 may intervene between the non-bonded parts.

The laminate films 60, 60 are molded in advance into a shape shown in FIGS. 2 and 3. The molding into this shape is carried out using a conventionally known molding method.

In the lithium ion secondary battery 1, each of the positive electrode 2 and the negative electrode 3 is connected to an electrode terminal (positive electrode terminal 65, negative electrode terminal 66).

(Electrode Terminal)

The positive electrode terminal 65 is electrically connected to the non-applied part 22 of the positive electrode 2. The negative electrode terminal 66 is electrically connected to the non-applied part 32 of the negative electrode 3. In the present embodiment, the non-applied parts 22, 32 of the electrodes 2, 3 are joined to the electrode terminals 65, 66, respectively, by welding (vibration welding). The central parts, as viewed in the width direction, of the non-applied parts 22, 32 of the electrodes 2, 3 are joined to the electrode terminals 65, 66.

Each of the electrode terminals 65, 66 is joined via a sealant 64 in a part that passes through the battery case 6 so that the plastic resin layers 601 of the laminate films 60, 60 and the electrode terminals 65, 66 are kept in a sealed state.

The electrode terminals 65, 66 are made of a metal having a sheet form (foil form), and the sealant 64 is made of a resin that covers the electrode terminals 65, 66 having a sheet form. The sealant 64 covers the part where the electrode terminals 65, 66 overlap with the flat plate parts 61. Because the electrode terminals 65, 66 have a sheet form, the stress of deformation of the laminate films 60, which is caused by intervention of the electrode terminals 65, 66 at the part that passes through the battery case 6, can be reduced. Also, the welding (vibration welding) of the electrodes 2, 3 to the non-applied parts 22, 32 can be easily carried out.

Effects of Second Embodiment

The lithium ion secondary battery 1 of the present embodiment has the same configuration as in the first embodiment except having a different shape, and produces the same effect as in the first embodiment.

In other words, though the lithium ion secondary battery 1 of the present embodiment is applied to a battery of lamination type, the present disclosure is not limited to this embodiment. For example, batteries having various shapes such as a coin-type, a cylindrical type, and a prismatic type can be made in addition to the lithium ion secondary battery 1 of lamination type having an indefinite shape of the second embodiment.

Also, an assembled battery in which the lithium ion secondary batteries 1 are combined in series and/or in parallel may be formed.

EXAMPLES

Hereinafter, the present disclosure will be described by way of working examples.

As a working example for specifically describing the present disclosure, a positive electrode (electrode) having a positive electrode active substance (positive electrode material) was produced. Further, a lithium ion secondary battery including the positive electrode (electrode) was produced. Production of the positive electrode 2 and the lithium ion secondary battery 1 of each example was carried out in a dry atmosphere in a dry box.

Example 1

The positive electrode of the present example is formed by using, as a positive electrode active substance, a positive electrode material having a core part made of $LiFe_{0.3}Mn_{0.7}PO_4$ having an olivine structure (one kind of polyanion structure) and a shell part obtained by covering the surface of the core part with carbon.

Further, the positive electrode 2 was formed in such a manner that a positive electrode mixture, which was obtained by mixing 88 parts by mass of the positive electrode active substance, 4 parts by mass of acetylene black (AB), 2 parts by mass of vapor-grown carbon fiber (VGCF), and 6 parts by mass of a PVDF binder into a solvent, was applied onto the positive electrode current collector 20 made of an aluminum foil, followed by drying to form the positive electrode active substance layer 21. The positive electrode active substance layer 21 was formed to have a thickness of 50 μm.

In the present example, the positive electrode active substance layer 21 had a specific surface area of 15.9 ($m^2/g$), a total mass ratio of carbonaceous materials of 7.6 (mass %), and a density of 1.87 ($g/cm^3$).

Also, the specific surface area of the core part of the positive electrode material was 15 ($m^2/g$), and the ratio of carbon coat of the shell part was 2.5 (mass %). In other words, the value 0.07 times as large as the specific surface area of the core part (that is, 1.05) is smaller than the value of the ratio of carbon coat of the shell part (that is, 2.5).

The characteristics of the positive electrode of the present example are shown in Table 1.

TABLE 1

| | Positive electrode material | | | | Second positive electrode active substance |
|---|---|---|---|---|---|
| | Core part chemical formula | Structure | Specific surface area ($m^2/g$) | Coating ratio (mass %) | Core part chemical formula |
| Example 1 | $LiFe_{0.3}Mn_{0.7}PO_4$ | Olivine | 15 | 2.5 | — |
| Example 2 | $LiFe_{0.2}Mn_{0.8}PO_4$ | Olivine | 20 | 2.5 | $LiNi_{0.5}Co_{0.2}Mn_{0.3}O_2$ |
| Example 3 | $LiFe_{0.3}Mn_{0.7}PO_4$ | Olivine | 13 | 1 | $LiNi_{0.5}Co_{0.2}Mn_{0.3}O_2$ |
| Example 4 | $LiFe_{0.2}Mn_{0.8}PO_4$ | Olivine | 9 | 1.5 | $LiNi_{1/3}Co_{1/3}Mn_{1/3}O_2$ |
| Comparative Example 1 | $LiFe_{0.3}Mn_{0.7}PO_4$ | Olivine | 20 | 2.5 | — |
| Comparative Example 2 | $LiFe_{0.3}Mn_{0.7}PO_4$ | Olivine | 25 | 2.8 | — |
| Comparative Example 3 | $LiFe_{0.3}Mn_{0.7}PO_4$ | Olivine | 15 | 1 | — |
| Comparative Example 4 | $LiFe_{0.3}Mn_{0.7}PO_4$ | Olivine | 15 | 2.5 | — |
| Comparative Example 5 | $LiNi_{1/3}Co_{1/3}Mn_{1/3}PO_4$ | Layered | 1 | 0 | — |
| Comparative Example 6 | $LiFePO_4$ | Olivine | 10 | 2 | — |

| | Second positive electrode active substance Structure | Mixing ratio | Positive electrode active substance layer | | |
|---|---|---|---|---|---|
| | | | Specific surface area ($m^2/g$) | Carbonaceous material ratio (mass %) | Density ($g/cm^3$) |
| Example 1 | — | — | 15.9 | 7.6 | 1.87 |
| Example 2 | Layered | 90:10 | 18.8 | 7.3 | 2.05 |
| Example 3 | Layered | 70:30 | 10.3 | 4.4 | 2.14 |
| Example 4 | Layered | 70:30 | 7.4 | 6.2 | 2.26 |
| Comparative Example 1 | — | — | 21.7 | 10.4 | 2.01 |
| Comparative Example 2 | — | — | 25.3 | 7.6 | 2.21 |
| Comparative Example 3 | — | — | 13.8 | 8.1 | 1.98 |
| Comparative Example 4 | — | — | 15.9 | 7.6 | 2.31 |
| Comparative Example 5 | — | — | 2.5 | 3.7 | 3.1 |
| Comparative Example 6 | — | — | 11.2 | 7.1 | 1.95 |

Example 2

The positive electrode of the present example is formed by using, as a positive electrode active substance, a mixture of a positive electrode material having a core part made of $LiFe_{0.2}Mn_{0.8}PO_4$ having an olivine structure (one kind of polyanion structure) and a shell part obtained by covering the surface of the core part with carbon, and a second positive electrode active substance made of $LiNi_{0.5}CO_{0.2}Mn_{0.3}O_2$. The positive electrode active substance of the present example is made by mixing the positive electrode material and the second positive electrode active substance in a mass ratio of 90:10.

Further, the positive electrode 2 was formed in such a manner that a positive electrode mixture, which was obtained by mixing 94 parts by mass of the positive electrode active substance, 3 parts by mass of AB, 3 parts by mass of VGCF, and 6 parts by mass of a PVDF binder into a solvent, was applied onto the positive electrode current collector 20 made of an aluminum foil, followed by drying to form the positive electrode active substance layer 21. The positive electrode active substance layer 21 was formed to have a thickness of 50 μm.

In the present example, the positive electrode active substance layer 21 had a specific surface area of 18.8 ($m^2/g$), a total mass ratio of carbonaceous materials of 7.3 (mass %), and a density of 2.05 ($g/cm^3$).

Also, the specific surface area of the core part of the positive electrode material was 20 ($m^2/g$), and the ratio of carbon coat of the shell part was 2.5 (mass %). In other words, the value 0.07 times as large as the specific surface area of the core part (that is, 1.4) is smaller than the value of the ratio of carbon coat of the shell part (that is, 2.5).

The characteristics of the positive electrode of the present example are shown together in Table 1.

Example 3

The positive electrode of the present example is formed by using, as a positive electrode active substance, a mixture of a positive electrode material having a core part made of $LiFe_{0.3}Mn_{0.7}PO_4$ having an olivine structure (one kind of polyanion structure) and a shell part obtained by covering the surface of the core part with carbon, and a second positive electrode active substance made of $LiNi_{0.5}CO_{0.2}Mn_{0.3}O_2$. The positive electrode active substance of the present example is made by mixing the positive electrode material and the second positive electrode active substance in a mass ratio of 70:30.

Further, the positive electrode 2 was formed in such a manner that a positive electrode mixture, which was obtained by mixing 92 parts by mass of the positive electrode active substance, 2 parts by mass of AB, 2 parts by mass of VGCF, and 4 parts by mass of a PVDF binder into a solvent, was applied onto the positive electrode current collector 20 made of an aluminum foil, followed by drying to form the positive electrode active substance layer 21. The positive electrode active substance layer 21 was formed to have a thickness of 50 μm.

In the present example, the positive electrode active substance layer 21 had a specific surface area of 10.3 ($m^2/g$), a total mass ratio of carbonaceous materials of 4.4 (mass %), and a density of 2.14 ($g/cm^3$).

Also, the specific surface area of the core part of the positive electrode material was 13 ($m^2/g$), and the ratio of carbon coat of the shell part was 1.0 (mass %). In other words, the value 0.07 times as large as the specific surface area of the core part (that is, 0.91) is smaller than the value of the ratio of carbon coat of the shell part (that is, 1.0).

The characteristics of the positive electrode of the present example are shown together in Table 1.

Example 4

The positive electrode of the present example is formed by using, as a positive electrode active substance, a mixture of a positive electrode material having a core part made of $LiFe_{0.2}Mn_{0.8}PO_4$ having an olivine structure (one kind of polyanion structure) and a shell part obtained by covering the surface of the core part with carbon, and a second positive electrode active substance made of $LiNi_{1/3}Co_{1/3}Mn_{1/3}O_2$. The positive electrode active substance of the present example is made by mixing the positive electrode material and the second positive electrode active substance in a mass ratio of 70:30.

Further, the positive electrode 2 was formed in such a manner that a positive electrode mixture, which was obtained by mixing 92 parts by mass of the positive electrode active substance, 2 parts by mass of AB, 2 parts by mass of VGCF, and 4 parts by mass of a PVDF binder into a solvent, was applied onto the positive electrode current collector 20 made of an aluminum foil, followed by drying to form the positive electrode active substance layer 21. The positive electrode active substance layer 21 was formed to have a thickness of 50 μm.

In the present example, the positive electrode active substance layer 21 had a specific surface area of 7.4 ($m^2/g$), a total mass ratio of carbonaceous materials of 6.2 (mass %), and a density of 2.26 ($g/cm^3$).

Also, the specific surface area of the core part of the positive electrode material was 9.0 ($m^2/g$), and the ratio of carbon coat of the shell part was 1.5 (mass %). In other words, the value 0.07 times as large as the specific surface area of the core part (that is, 0.63) is smaller than the value of the ratio of carbon coat of the shell part (that is, 1.5).

The characteristics of the positive electrode of the present example are shown together in Table 1.

Comparative Example 1

The positive electrode of the present example is formed by using, as a positive electrode active substance, a positive electrode material made of $LiFe_{0.3}Mn_{0.7}PO_4$ having an olivine structure (one kind of polyanion structure). The positive electrode active substance of the present example is the active substance that forms the core part in the positive electrode material of Example 2.

Further, the positive electrode 2 was formed in such a manner that a positive electrode mixture, which was obtained by mixing 90 parts by mass of the positive electrode active substance, 10 parts by mass of AB, and 10 parts by mass of a PVDF binder into a solvent, was applied onto the positive electrode current collector 20 made of an aluminum foil, followed by drying to form the positive electrode active substance layer 21. The positive electrode active substance layer 21 was formed to have a thickness of 50 μm.

In the present example, the positive electrode active substance layer 21 had a specific surface area of 21.7 ($m^2/g$), a total mass ratio of carbonaceous materials of 10.4 (mass %), and a density of 2.01 ($g/cm^3$).

The characteristics of the positive electrode of the present example are shown together in Table 1.

Comparative Example 2

The positive electrode of the present example is formed by using, as a positive electrode active substance, a positive electrode material having a core part made of $LiFe_{0.3}Mn_{0.7}PO_4$ having an olivine structure (one kind of polyanion structure) and a shell part obtained by covering the surface of the core part with carbon.

Further, the positive electrode 2 was formed in such a manner that a positive electrode mixture, which was obtained by mixing 88 parts by mass of the positive electrode active substance, 4 parts by mass of AB, 2 parts by mass of VGCF, and 6 parts by mass of a PVDF binder into a solvent, was applied onto the positive electrode current collector 20 made of an aluminum foil, followed by drying to form the positive electrode active substance layer 21. The positive electrode active substance layer 21 was formed to have a thickness of 50 μm.

In the present example, the positive electrode active substance layer 21 had a specific surface area of 25.3 ($m^2/g$), a total mass ratio of carbonaceous materials of 7.6 (mass %), and a density of 2.21 ($g/cm^3$).

Also, the specific surface area of the core part of the positive electrode material was 25 ($m^2/g$), and the ratio of carbon coat of the shell part was 2.8 (mass %). In other words, the value 0.07 times as large as the specific surface area of the core part (that is, 1.75) is smaller than the value of the ratio of carbon coat of the shell part (that is, 2.8).

The characteristics of the positive electrode of the present example are shown together in Table 1.

Comparative Example 3

The positive electrode of the present example is formed by using, as a positive electrode active substance, a positive electrode material having a core part made of $LiFe_{0.3}Mn_{0.7}PO_4$ having an olivine structure (one kind of polyanion structure) and a shell part obtained by covering the surface of the core part with carbon.

Further, the positive electrode 2 was formed in such a manner that a positive electrode mixture, which was obtained by mixing 85 parts by mass of the positive electrode active substance, 6 parts by mass of AB, 3 parts by mass of VGCF, and 6 parts by mass of a PVDF binder into a solvent, was applied onto the positive electrode current collector 20 made of an aluminum foil, followed by drying to form the positive electrode active substance layer 21. The positive electrode active substance layer 21 was formed to have a thickness of 50 μm.

In the present example, the positive electrode active substance layer 21 had a specific surface area of 13.8 (m$^2$/g), a total mass ratio of carbonaceous materials of 8.1 (mass %), and a density of 1.98 (g/cm$^3$).

Also, the specific surface area of the core part of the positive electrode material was 15 (m$^2$/g), and the ratio of carbon coat of the shell part was 1 (mass %). In other words, the value 0.07 times as large as the specific surface area of the core part (that is, 1.05) is larger than the value of the ratio of carbon coat of the shell part (that is, 1).

The characteristics of the positive electrode of the present example are shown together in Table 1.

Comparative Example 4

The positive electrode of the present example is obtained by performing press-molding on the positive electrode 2 of Example 1.

The positive electrode of the present example had a density of 2.31 (g/cm$^3$) after the press-molding.

Also, in the present example, the positive electrode active substance layer 21 had a specific surface area of 15.9 (m$^2$/g) and a total mass ratio of carbonaceous materials of 7.6 (mass %).

The characteristics of the positive electrode of the present example are shown together in Table 1.

Comparative Example 5

The positive electrode of the present example is formed by using, as a positive electrode active substance, a positive electrode material made of LiNi$_{1/3}$CO$_{1/3}$Mn$_{1/3}$O$_2$ having a layer structure. The positive electrode active substance of the present example is the active substance that forms the core part in the positive electrode material of Example 2.

Further, the positive electrode 2 was formed in such a manner that a positive electrode mixture, which was obtained by mixing 96 parts by mass of the positive electrode active substance, 2 parts by mass of AB, 2 parts by mass of VGCF, and 6 parts by mass of a PVDF binder into a solvent, was applied onto the positive electrode current collector 20 made of an aluminum foil, followed by drying to form the positive electrode active substance layer 21. The positive electrode active substance layer 21 was formed to have a thickness of 50 μm.

In the present example, the positive electrode active substance layer 21 had a specific surface area of 2.5 (m$^2$/g), a total mass ratio of carbonaceous materials of 3.7 (mass %), and a density of 3.1 (g/cm$^3$).

The characteristics of the positive electrode of the present example are shown together in Table 1.

Comparative Example 6

The positive electrode of the present example is formed by using, as a positive electrode active substance, a positive electrode material having a core part made of LiFePO$_4$ having an olivine structure (one kind of polyanion structure) and a shell part obtained by covering the surface of the core part with carbon.

Further, the positive electrode 2 was formed in such a manner that a positive electrode mixture, which was obtained by mixing 90 parts by mass of the positive electrode active substance, 4 parts by mass of AB, and 6 parts by mass of a PVDF binder into a solvent, was applied onto the positive electrode current collector 20 made of an aluminum foil, followed by drying to form the positive electrode active substance layer 21. The positive electrode active substance layer 21 was formed to have a thickness of 50 μm.

Here, in the present example, the positive electrode active substance layer 21 had a specific surface area of 11.2 (m$^2$/g), a total mass ratio of carbonaceous materials of 7.1 (mass %), and a density of 1.95 (g/cm$^3$).

Also, the specific surface area of the core part of the positive electrode material was 10 (m$^2$/g), and the ratio of carbon coat of the shell part was 2 (mass %). In other words, the value 0.07 times as large as the specific surface area of the core part (that is, 0.7) is smaller than the value of the ratio of carbon coat of the shell part (that is, 1).

The characteristics of the positive electrode of the present example are shown together in Table 1.

(Evaluation of Positive Electrode)

As an evaluation of the positive electrode of each example, the amount of contained water was measured.

(Measurement of Amount of Water)

The amount of water in the positive electrode was measured by using a Karl Fischer testing apparatus.

Specifically, after the amount of water was measured at 120° C.×5 minutes, 30 minutes by using a heating vaporization method, the amount of water was continuously measured at 250° C. without exposure to ambient air. The measurement results are shown in Table 2.

TABLE 2

| | Amount of water | | | Safety test | | Battery characteristics |
|---|---|---|---|---|---|---|
| | 120° C. × 5 minutes (ppm) | 120° C. × 30 minutes (ppm) | 250° C. × 40 minutes (ppm) | Nail penetration test | Gas generation test | Average electric potential (V) |
| Example 1 | 1218 | 1558 | 1233 | Non-Defective | Non-Defective | 3.76 |
| Example 2 | 1088 | 1324 | 1132 | Non-Defective | Non-Defective | 3.81 |
| Example 3 | 849 | 1210 | 957 | Non-Defective | Non-Defective | 3.73 |
| Example 4 | 1233 | 1651 | 1455 | Non-Defective | Non-Defective | 3.8 |
| Comparative Example 1 | 1847 | 2278 | 1826 | Non-Defective | Defective | 3.75 |
| Comparative Example 2 | 2218 | 4211 | 2841 | Non-Defective | Defective | 3.71 |
| Comparative Example 3 | 1318 | 1618 | 1697 | Non-Defective | Defective | 3.72 |
| Comparative Example 4 | 1228 | 2855 | 1448 | Non-Defective | Defective | 3.75 |

TABLE 2-continued

|  | Amount of water | | | Safety test | | Battery characteristics |
|---|---|---|---|---|---|---|
|  | 120° C. × 5 minutes (ppm) | 120° C. × 30 minutes (ppm) | 250° C. × 40 minutes (ppm) | Nail penetration test | Gas generation test | Average electric potential (V) |
| Comparative Example 5 | 244 | 298 | 651 | Defective | Non-Defective | 3.7 |
| Comparative Example 6 | 1335 | 1541 | 1011 | Non-Defective | Non-Defective | 3.18 |

As shown in Table 2, in each of the positive electrodes of Examples 1 to 4, the amount of water, as measured by the KF method when the electrode is held at 250° C. for 40 minutes after adsorbed water is volatilized at 120° C.×5 minutes, 30 minutes, is 1500 ppm or less. In contrast, in each of the positive electrodes of Comparative Examples 1 to 4, the amount of water is larger than 1500 ppm. In the positive electrode of Comparative Example 5, the positive electrode active substance has a layer structure which is a structure different from the polyanion structure.

(Evaluation of Safety)

By using each of the positive electrodes described above, a lithium ion secondary battery was produced, and evaluation of safety was carried out.

As the evaluation of safety, a nail penetration test and a gas generation test were carried out.

(Lithium Ion Secondary Battery)

By using the positive electrode of each example described above, the lithium ion secondary battery 1 of lamination type of the second embodiment was produced.

The lithium ion secondary battery 1 is formed by stacking the positive electrode plate 2 and the negative electrode plate 3 via the separator 5 and enclosing the resultant into the battery case 6 together with the non-aqueous electrolyte 4.

The positive electrode plate 2 is the positive electrode of each example described above. Here, an aluminum foil having a thickness of 0.015 mm was used as the positive electrode current collector 20.

The negative electrode plate 3 is made by using graphite as a negative electrode active substance. First, a negative electrode mixture was prepared by mixing a negative electrode active substance (graphite/SMG: 98 parts by mass), a binding agent (styrene-butadiene rubber/SBR: 1 part by mass), and a binding agent (carboxymethyl cellulose/CMC: 1 part by mass) into a solvent. The negative electrode mixture was applied onto both the surfaces of the negative electrode current collector 30 made of a copper foil having a thickness of 0.01 mm, followed by drying and compressing to obtain the negative electrode active substance layer 21 having a weight per unit area on one surface of 0.0886 mg/mm$^2$.

A porous membrane made of polyethylene having a thickness of 0.016 mm was used as the separator 5.

The non-aqueous electrolyte 4 was prepared by dissolving LiPF$_6$ at 1 mol % into a mixed solvent obtained by mixing EC:DMC:EMC at a ratio of 30:30:40 (vol %).

(Nail Penetration Test)

First, a constant-current charging was carried out up to the upper-limit charging voltage (4.2 V) at a current value (⅓ C) by which the battery capacity of the lithium ion secondary battery 1 of each example can be charged in 3 hours, and thereafter, a constant-voltage charging was carried out until the current value became 1/10 C.

Through the secondary battery 1 brought into a fully charged state, a nail made of ion having a diameter of 3 mm was penetrated at a speed of 10 mm/sec around the center of the secondary battery 1 (center of the electrode active substance layers 21, 31) at a testing temperature of 25° C.

A thermocouple was disposed on the outer surface of the secondary battery 1 during the nail penetration test, so as to measure the maximum temperature of the secondary battery 1. The case in which the maximum temperature was 300° C. or lower was determined to be one of a good product and was shown together by denoting with "Non-Defective" in Table 2. The case in which the maximum temperature exceeded 300° C. was denoted with "Defective".

(Gas Generation Test)

With an upper-limit electric potential of 4.2 V and a lower-limit electric potential of 2.6 V, charging and discharging at 60° C.-0.1 C were repeated for 100 cycles on the lithium ion secondary battery 1 of lamination type having a battery capacity of 5 Ah.

Generation of gas in the inside of the secondary battery 1 after 100 cycles was confirmed. The confirmation of gas generation was carried out by confirming the volume change (expansion) of the battery case 6 of lamination type by eye inspection. The batteries in which no expansion was seen were determined to be good products and shown together in Table 2 by being denoted with "Non-Defective". The batteries in which expansion was seen were denoted with "Defective".

As shown in Table 2, in the secondary battery 1 of each of Examples 1 to 4 and Comparative Examples 1 to 4, excessive rise in the temperature of the secondary battery 1 is restrained, even when the nail penetration test is carried out, by using an oxide (compound) having an olivine structure (polyanion structure) as the positive electrode active substance. In contrast, in Comparative Example 5 in which an oxide (compound) having a layer structure is used as the positive electrode active substance, the temperature of the secondary battery 1 in the nail penetration test rises to a temperature exceeding 300° C.

Also, in the secondary batteries 1 of Examples 1 to 4, generation of gas could not be confirmed even after charging and discharging were carried out for 100 cycles. In contrast, in the secondary batteries 1 of Comparative Examples 1 to 4, expansion of the battery case 6 was confirmed after charging and discharging were carried out for 100 cycles, whereby generation of gas was confirmed.

As shown above, it was confirmed that the secondary batteries 1 made by using the positive electrode 2 of Examples 1 to 4 are secondary batteries with restrained generation of gas and having an excellent safety.

(Average Electric Potential)

With an upper-limit electric potential of 4.2 V and a lower-limit electric potential of 2.6 V, charging and discharging at 0.1 C were carried out on the lithium ion secondary battery 1 of lamination type having a battery capacity of 5 Ah. The value calculated by dividing the obtained quantity of electricity (Wh) by the battery capacity (Ah) was determined as an average electric potential. The obtained average electric potential is shown together in Table 2.

As shown in Table 2, the secondary battery 1 of each of Examples 1 to 4 and Comparative Examples 1 to 4 has a high average electric potential of 3.7 (V) or higher by using an oxide (compound) having an olivine structure (polyanion structure) containing Mn in a core part of the positive electrode active substance. In contrast, in Comparative Example 6 using an oxide (compound) having an olivine structure (polyanion structure) that does not contain Mn in a core part of the positive electrode active substance, the average electric potential is considerably decreased to be 3.18 (V).

As shown above, the average electric potential of the secondary battery 1 can be raised to be 3.7 (V) or higher by using an oxide (compound) having an olivine structure (polyanion structure) containing Mn in a core part of the positive electrode active substance. In other words, it was confirmed that, by having a high average electric potential, the secondary battery can be made to have a high energy density.

While the present disclosure has been described with reference to embodiments thereof, it is to be understood that the disclosure is not limited to the embodiments and configurations. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An electrode comprising:
an electrode material that includes:
a core part made of a first core part and a second core part, the first core part including a first active substance having a polyanion structure having Mn, and the second core part including a second active substance having an oxide with a layer structure; and
a shell part obtained by covering a surface of the core part with carbon, wherein an amount of chemically bonded water in the electrode material, as measured by Karl Fischer's method when the electrode is held at 250° C. for 40 minutes after adsorbed water is volatilized by heating, is 1500 ppm or less;
wherein a mass of the first active substance is 70 mass % or more, and a mass of the second active substance is 30 mass % or less, with a sum mass of the first active substance and the second active substance being 100 mass %,
wherein the electrode is obtained by arranging an active substance layer having the electrode material on a surface of a current collector,
wherein the active substance layer has a density, which is expressed in $g/cm^3$, within a range between 1.8 $g/cm^3$ and 2.3 $g/cm^3$;
wherein the active substance layer has a specific surface area, which is expressed in $m^2/g$, within a range between 5 $m^2/g$ and 20 $m^2/g$; and
wherein a total mass of a carbonaceous material included in the active substance layer is within a range between 4 mass % and 8 mass %, with a mass of a whole of the active substance layer being 100 mass %.

2. The electrode according to claim 1,
wherein volatilization of the adsorbed water is carried out by heating to 120° C.

3. The electrode according to claim 2,
wherein an amount of the volatilization of the absorbed water, as measured by Karl Fischer's method when the electrode is held at 120° C. for 30 minutes, is 2000 ppm or less.

4. The electrode according to claim 1,
wherein the electrode material satisfies a relationship of: 0.07×A<B, where A represents a total specific surface area, which is expressed in $m^2/g$, of the first active substance and the second active substance; and B represents a mass ratio, which is expressed in mass %, of the carbon that provides the shell part relative to the electrode material having a core-shell structure.

5. A non-aqueous electrolyte secondary battery, comprising:
the electrode according to claim 1 as a positive electrode.

6. An electrode, comprising:
an electrode material that includes:
a core part made of a first core part and a second core part, the first core part including a first active substance having a polyanion structure having Mn, and the second core part having a second active substance having an oxide with a layer structure; and
a shell part obtained by covering a surface of the core part with carbon;
wherein an amount of water chemically bonded to the electrode material is 1500 ppm or less,
wherein a mass of the first active substance is 70 mass % or more, and a mass of the second active substance is 30 mass % or less, with a sum mass of the first active substance and the second active substance being 100 mass %,
wherein the electrode is obtained by arranging an active substance layer having the electrode material on a surface of a current collector, and
wherein the active substance layer has a density, which is expressed in $g/cm^3$, within a range between 1.8 $g/cm^3$ and 2.3 $g/cm^3$;
wherein the active substance layer has a specific surface area, which is expressed in $m^2/g$, within a range between 5 $m^2/g$ and 20 $m^2/g$; and
wherein a total mass of a carbonaceous material included in the active substance layer is within a range between 4 mass % and 8 mass %, with a mass of a whole of the active substance layer being 100 mass %.

7. The electrode according to claim 6, wherein
the electrode material is formed by being held at 250° C. for 40 minutes, after adsorbed water is volatilized by heating, so that the amount of water chemically bonded to the electrode material, as measured by Karl Fischer's method, is 1500 ppm or less.

* * * * *